United States Patent [19]

Looney

[11] Patent Number: 4,632,146
[45] Date of Patent: Dec. 30, 1986

[54] RELIEF VALVE
[75] Inventor: Raymond H. Looney, Tulsa, Okla.
[73] Assignee: Baird Manufacturing Company, Tulsa, Okla.
[21] Appl. No.: 765,558
[22] Filed: Aug. 13, 1985

Related U.S. Application Data
[63] Continuation of Ser. No. 593,847, Mar. 27, 1984, abandoned.

[51] Int. Cl.⁴ ............................................. F16K 17/06
[52] U.S. Cl. .................................. 137/539.5; 137/542
[58] Field of Search ................ 137/533.13, 539, 539.5, 137/540, 542

[56] References Cited
U.S. PATENT DOCUMENTS 2,699,180  1/1955  Frye ................................. 137/539.5
3,011,517 12/1961  Sanford .......................... 137/533.13
3,272,218  9/1966  Johnson ......................... 137/540 X
4,142,550  3/1979  Williams ......................... 137/542 X
4,474,208 10/1984  Looney ........................ 137/539.5 X

FOREIGN PATENT DOCUMENTS 1158466 12/1963 Fed. Rep. of Germany ... 137/539.5
 375008  6/1932 United Kingdom ............... 137/542
 592093  9/1947 United Kingdom ............. 137/539.5

Primary Examiner—Robert G. Nilson
Attorney, Agent, or Firm—Head, Johnson & Stevenson

[57] ABSTRACT

A relief valve adapted for use with either a liquid or gaseous flow stream and comprising a body having a cage member secured thereto and housing all of the working elements of the valve, the cage member being readily removable from and engagable with the body for converting the valve from liquid to gas installations and also removable from the body without disturbing the installation of the valve in a flow line, fluid containing vessel, or the like.

4 Claims, 8 Drawing Figures

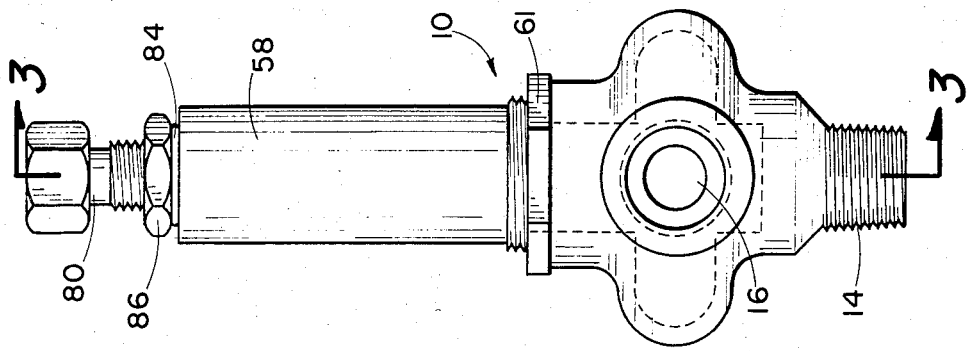
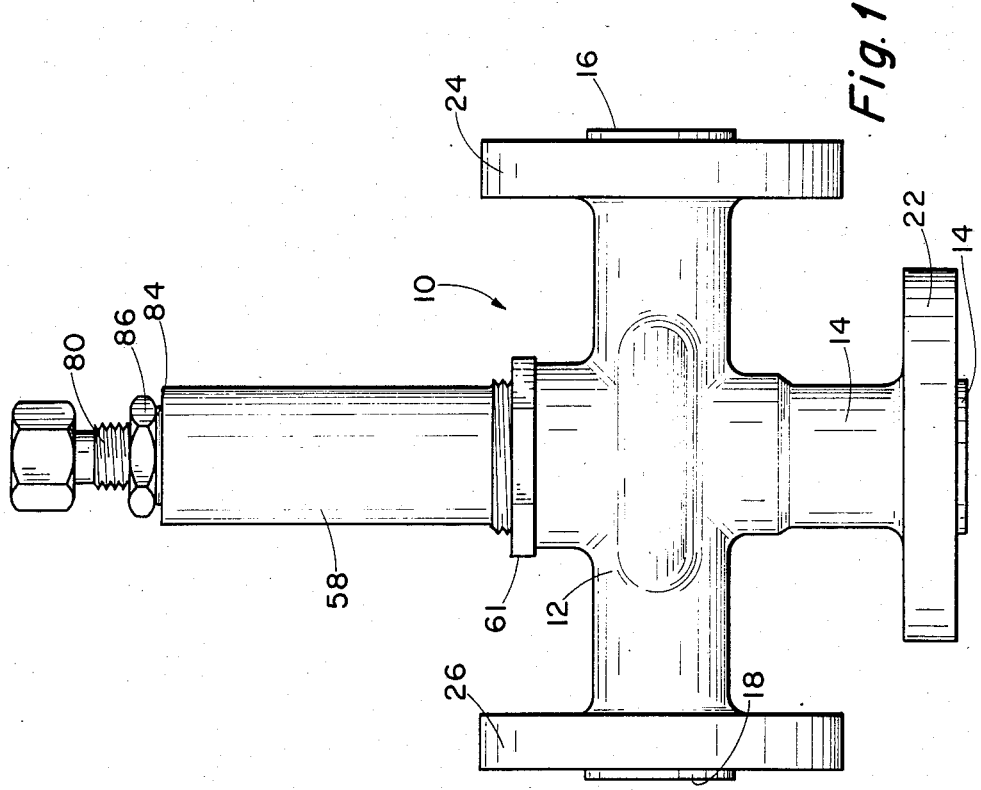

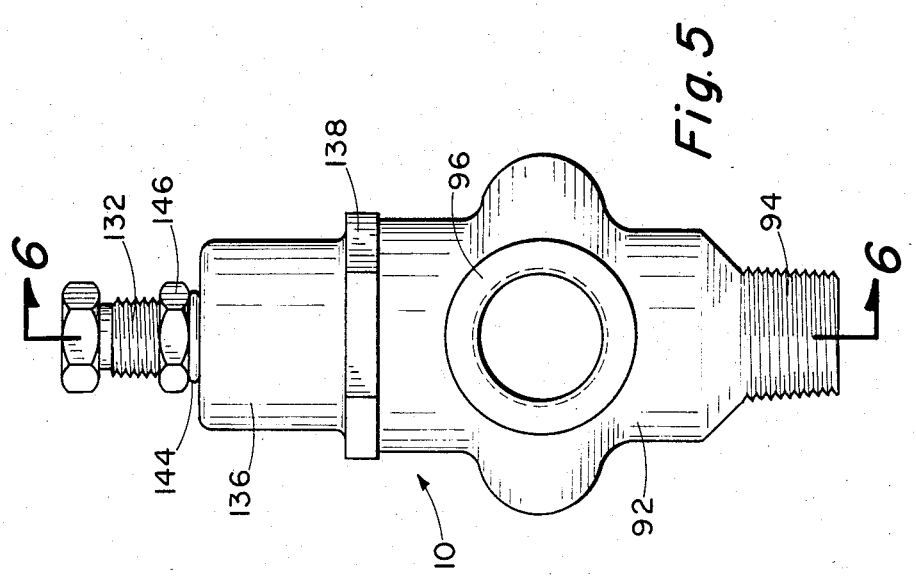
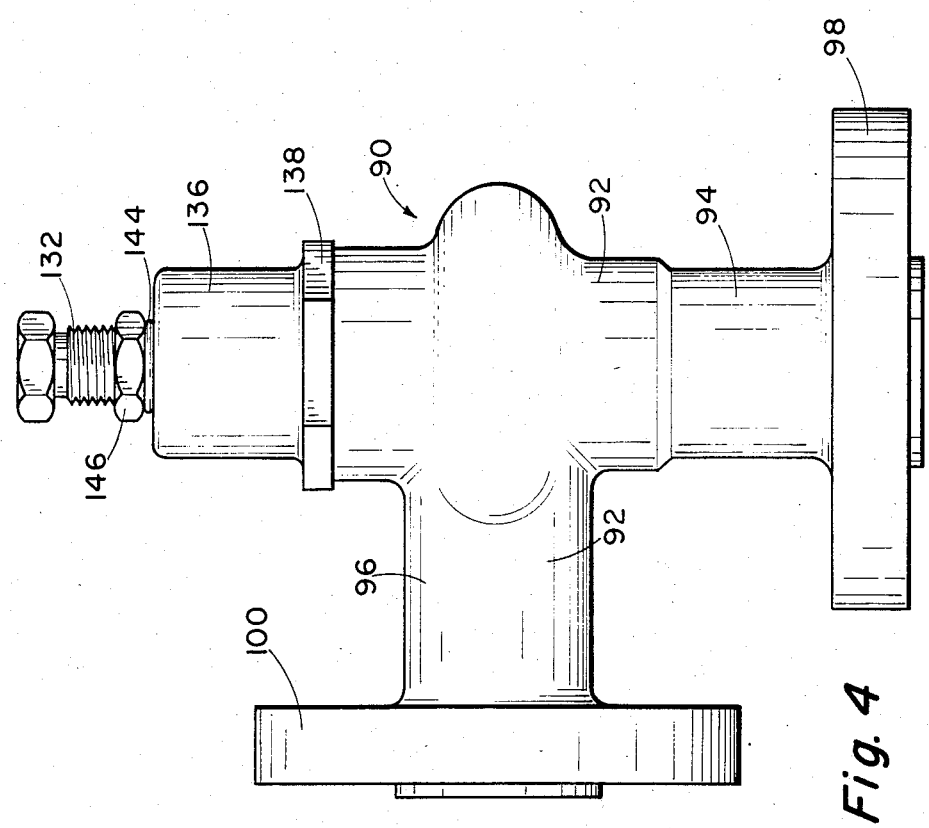

RELIEF VALVE

This is a continuation application of Ser. No. 593,847 filed Mar. 27, 1984 now abandoned.

BACKGROUND OF THE INVENTION

1. Field of the Invention

This invention relates to improvements in valves and more particularly, but not by way of limitation, to a relief valve adapted for use with either liquids or gaseous fluids.

2. Description of the Prior Art.

Relief valves are frequently used in order to vent fluid pressure from a fluid vessel, or the like, in order to prevent damage due to the excessive pressure build up within the fluid vessel. The problems related to the handling of liquids are usually different than the problems encountered in the handling of gaseous fluids, and it is normally necessary to change the relief valve from a gas valve to a liquid valve in the event the medium within the vessel is changed from a liquid to a gas. The removal and installation of the relief valve is usually time consuming and costly in that the fluid system may have to be at least partially "shut down" in order to replace the valve. Many relief valves have been developed for the venting of excessive fluid pressures, or for safety purposes, such as shown in the Hilliard U.S. Pat. No. 950,533, issued Mar. 1, 1910, and entitled "Valve;" Hudson U.S. Pat. No. 2,111,473, issued Mar. 15, 1938, and entitled "Combination Air Discharge and Vacuum Valve;" Roth U.S. Pat. No. 2,470,372, issued May 17, 1949, and entitled "Ball Type Pressure Relief Valve;" Goddard U.S. Pat. No. 2,770,255, issued Nov. 13, 1951 and entitled "Dual-Range Safety Valve;" Baker et al U.S. Pat. No. 2,771,091, issued Nov. 20, 1956, and entitled "Drill Pipe Float Valve;" Frain et al U.S. Pat. No. 2,793,656, issued May 28, 1957, and entitled "Relief Valve;" Fennema et al U.S. Pat. No. 2,831,500, issued Apr. 22, 1958, and entitled "Combined Relief and Check Valve Construction;" Mason et al U.S. Pat. No. 2,884,952, issued May 5, 1959, and entitled "Line Hydraulic Pressure Relief Valve;" Biddle U.S. Pat. No. 2,935,990, issued May 10, 1960, and entitled "Air and Vapor Eliminator for Pipe Lines;" Stahlhuth U.S. Pat. No. 2,964,310, issued Dec. 13, 1960, and entitled "Spring Assembly for Relief Valve;" Raymond U.S. Pat. No. 2,969,084, issued Jan. 24, 1961, and entitled "Pressure Responsive Valve;" Joles U.S. Pat. No. 3,145,732, issued Aug. 25, 1964, and entitled "Hydraulic Pressure Relief Valve;" Gassman U.S. Pat. No. 3,316,252, issued May 2, 1967, and entitled "Pressure Modulating Hydraulic Control Valve;" Hansen U.S. Pat. No. 3,347,266, issued Oct. 17, 1967, and entitled "Spring Biased Relief Valve;" Johnson U.S. Pat. No. 3,565,108, issued Feb. 23, 1971, and entitled "Fluid Valve;" Calisher et al U.S. Pat. No. 3,674,061, issued July 4, 1972, and entitled "Liquid Transfer Apparatus with Pressure-sensitive Automatic Shut-Off Nozzle;" Van Der Koogh U.S. Pat. No. 3,860,026, issued Jan. 14, 1975, and entitled "Automatic Air Vent;" Drori U.S. Pat. No, 4,011,884, issued Mar. 15, 1977, and entitled "Liquid-Level Valving Device Particularly Useful as Automatic Relief Valve;" Drori U.S. Pat. No. 4,209,032, issued Jan. 24, 1980, and entitled "Air-Relief Valves;" and Green U.S. Pat. No. 4,325,398, issued Apr. 20, 1982, and entitled "Safety and Venting Valves for Fuel Tanks Carried on Vehicles." These devices, however, do not appear to satisfactorily solve the problems hereinbefore set forth.

SUMMARY OF THE INVENTION

The present invention contemplates a novel relief valve particularly designed and constructed for facilitating the adaptation of the valve for either liquid or gaseous medium. The novel valve comprises a cartridge or cage assembly housing substantially all of the working parts of the valve structure, thus insuring a consistent precision fitting of the parts in relation to each other, as well as to facilitate or ease field repair of the valve in that the cartridge or cage assembly may be removed without removing the entire valve fixture from its installed position. The cage assembly may be interchanged between a gas valve and a liquid valve, thus providing greater utilization of the valve structure. In addition, the valve may be utilized in either a flanged connection installation or a screwtype connection installation and may be of either a single or dual port embodiment. The novel valve is simple and efficient in operation and economical and durable in construction.

BRIEF DESCRIPTION OF THE DRAWINGS

FIG. 1 is a side elevational view of a relief valve embodying the invention, and particularly illustrates a valve adapted for a flange connection with a flow line, or the like.

FIG. 2 is an end elevational view of a relief valve similar to the valve shown in FIG. 1, and particularly illustrates a valve adapted for a screw type connection upon installation of the valve.

FIG. 4 is a side elevational view of a modified relief valve embodying the invention, particularly illustrating a valve adapted for connection with a flange fitting, or the like.

FIG. 5 is an end elevational view of a relief valve similar to the valve shown in FIG. 4, illustrating a valve adapted for a screw type connection upon installation of the valve.

DETAILED DESCRIPTION OF THE PREFERRED EMBODIMENT

Figure 3:
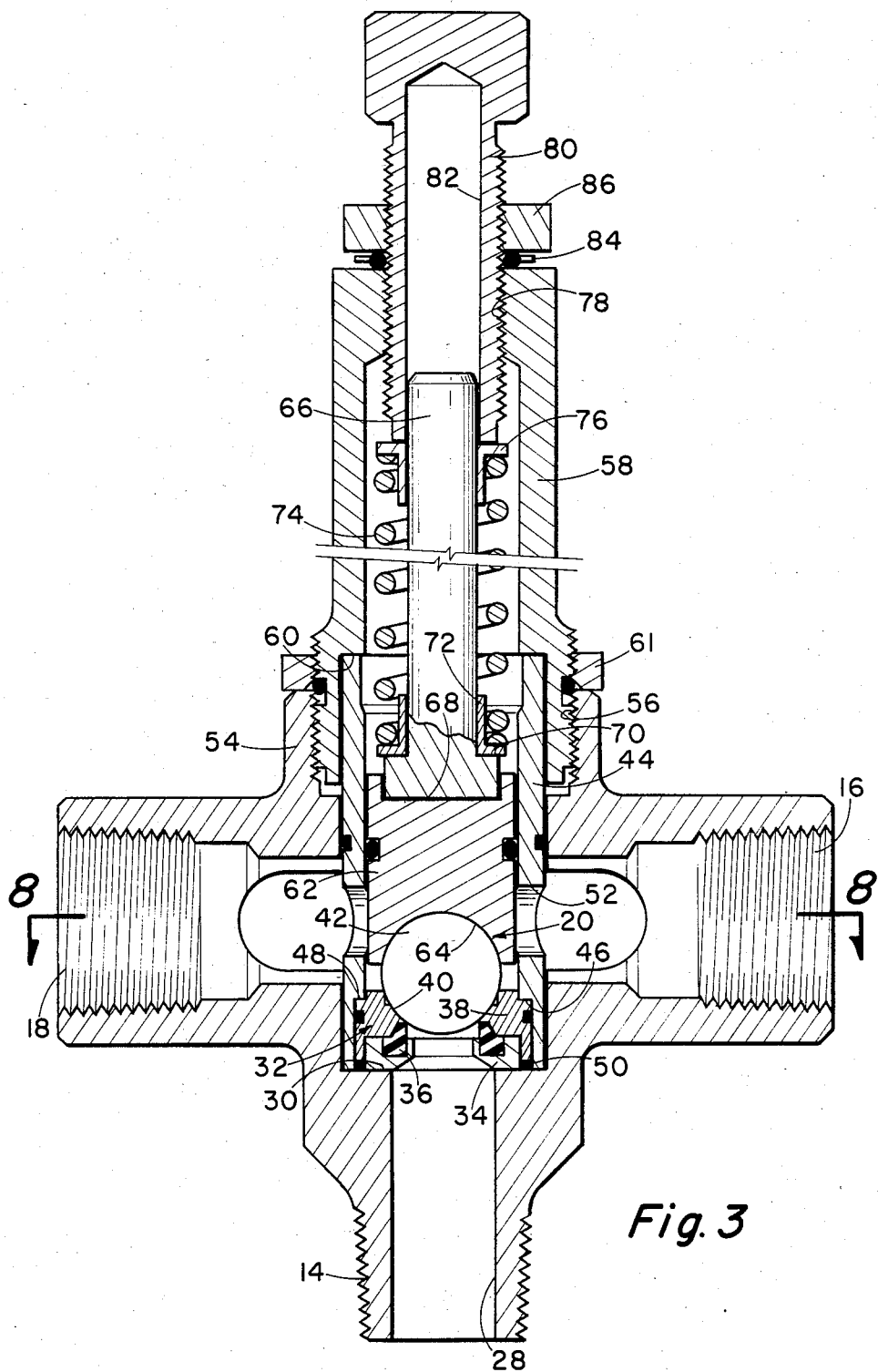
FIG. 3 is a view taken on line 3—3 of FIG. 2.

Referring to the drawings in detail, and particularly FIGS. 1, 2, 3 and 8, reference numeral 10 generally indicates a relief valve comprising a substantially T-shaped body or housing 12 having an inlet port means 14 and a pair of axially aligned outlet ports 16 and 18 in communication with the inlet port means 14 through a reciprocal valve assembly 20 as will be hereinafter set forth. The embodiment of the valve 10 as illustrated in FIG. 1 includes suitable circumferential flange members 22, 24 and 26 provided around the outer periphery of the ports 14, 16 and 18, respectively, for facilitating connection or installation of the valve 10 in a flow line, or the like (not shown) having the usual flange fittings (not shown), as is well known. The embodiment of the valve 10 as illustrated in FIG. 2 is substantially identical with the embodiment shown in FIG. 1, with the exception that each of the ports 14, 16 and 18 is provided with a threaded means for facilitating installation of the valve 10 in a flow line (not shown) or the like wherein the connection means are threaded elements, as is well known. The valve 10 is installed in the flow line, vessel, or the like (not shown) in such a manner that the inlet port means 14 is in open communication with the interior of the flow line or vessel for receiving the fluid pressure therefrom. The ports 16 and 18 are preferably open to the atmosphere, but not limited thereto, for venting of the pressure from the port 14 in the event the pressure therein exceeds a predetermined quantity.

The inlet port means 14 includes an internal passageway 28 extending longitudinally therethrough and enlarged at 30 to provide an annular shoulder for receiving a valve seating means 32 thereagainst. The valve seating means 32 comprises an annular cup member 34 having a sealing ring means 36 secured thereto in any suitable manner. The sealing ring means 36 is preferably constructed from a suitable yieldable material, such as rubber, neoprenen, or the like, and may be secured in position by a sleeve means 38 extending over the outer periphery of the cup member 34 and having a central aperture 40 providing the valve seat for a ball member 42.

An open ended cylindrical housing means on cage 44 is disposed within the valve body 12 and has one end disposed around the outer periphery of the sleeve means 38 as particularly shown in FIG. 3. An inwardly directed annular shoulder 46 is provided on the inner periphery of the cage 44 and engages an outwardly directed annular shoulder 48 provided on the outer periphery of the sleeve means 38 for securely retaining the sleeve 38 and cup means 34 in engagement with the shoulder 30. Of course, suitable sealing means, such as O-rings 50 may be interposed between the housing 44 and the sleeve means 38 for precluding leakage of fluid therebetween.

The cage 44 is provided with a plurality of circumferentially spaced ports 52 in the proximity of the outlet ports 16 and 18 and the outer end of the housing 44 extends axially through a sleeve means 54 extending outwardly from the body 12 in axial alignment with the inlet port 14 or passageway 28. The inner periphery of the sleeve 54 is provided with a threaded portion 56 for threaded engagement with housing member or cap 58. An inwardly directed annular shoulder 60 is provided on the inner periphery of the sleeve 58 for engagement with the outer end of the housing 44 in order to securely retain the cage 44 in engagement with the shoulder 30 and sleeve means 38, thus securely retaining the valve seat means 32 in position within the valve body 12. Of course, a suitable lock nut 61 may be threadedly engaged with the outer periphery of the cap 58 in the proximity of the sleeve 54 for securely retaining the cap 58 secured to the body 12, as is well known.

A ball keeper member 62 is slidably disposed within the cage 44, and is preferably provided with an arcuate or semi-spherical recess 64 in one end thereof for engagement with the outer periphery of the ball member 42. A stem or keeper guide means 66 has one end disposed within a central recess 68 provided in the opposite end of the ball keeper 62. An annular shoulder 70 is provided around the outer periphery of the stem or ball keeper 66 for receiving a first spring keeper 72 thereagainst. One end of a suitable helical spring means 74 is anchored against the spring keeper 72, and the opposite end of the spring 74 is anchored against a second spring keeper 76 slidably disposed around the outer periphery of the stem 66 in spaced relation with respect to the spring keeper 72. The outer end of the cap 58 is provided with a threaded central bore 78 for receiving an adjustment screw 80 therein. The adjustment screw 80 is provided with a central bore 82 extending longitudinally therein and open for slidably receiving the outer end of the keeper guide 66 therein. The inner end of the adjustment screw 80 extends into engagement with the second spring keeper 76, and the longitudinal position of the adjustment screw 80 with respect to the keeper guide 66 determines the position of the second spring keeper member 76 on the guide 66, thus adjusting the pressure of the spring means 74 interposed between the spring keepers 72 and 76. Of course, it is preferable to provide suitable sealing means 84 around the outer periphery of the adjusting screw 80 in the proximity of the cap 58, and a suitable lock nut 86 is preferably secured around the outer periphery of the adjusting screw 80 for bearing against the sealing means 84 in order to securely retain the screw 80 in the selected longitudinal position thereof with regard to the cap 58 and/or guide 66, as is well known.

In use, the valve 10 becomes a high volume gas safety valve and may be installed in a flow line (not shown) or on a suitable fluid containing vessel (not shown) or the like, in such a manner that the inlet port 14 and inlet passageway 28 are in open communication with the interior of the flow line or vessel for receiving the fluid pressure therefrom. The adjusting screw 80 may be positioned in such a manner as to provide a preselected or desired pressure for the spring means 74 acting against the ball keeper 62. As long as the fluid pressure present in the passageway 28 is less than the force of the spring 74, the ball member 42 is securely retained in position against the valve seat assembly 32, thus precluding escape of the fluid pressure through the valve 10. When the pressure within the passageway 28 exceeds the force of the spring 74, the ball 42 and ball keeper 62 are moved against the spring pressure, thus opening the communication between the inlet port 14 and the outlet ports 16 and 18 for venting the pressure therethrough. The valve 10 remains in the open position until the pressure in the passageway 28 falls below the force of the spring 74, whereupon the ball will be returned to the engagement with the valve seat for closing of the valve 10.

Referring now to FIGS. 4, 5, 6 and 7, a modified relief valve is generally indicated at 90 and comprises a substantially L-shaped housing or body 92 having an inlet port means 94 and an outlet port means 96. The valve 90 shown in FIG. 5 is substantially identical with the valve 90 as shown in FIG. 4; the only difference being that the inlet port means 94 of FIG. 4 is provided with an outwardly extending circumferential flange means 98, and the outlet port means 96 of FIG. 4 is similarly provided with an outwardly extending circumferential flange means 100 for facilitating installation of the valve 90 in a flow line (not shown), fluid controlling vessel (not shown) or the like having flange fittings, as is well known. The inlet port 94 and outlet port 96 of FIG. 5 is provided with threads in lieu of the flanges 98 and 100 whereby the valve 90 may be installed in a threaded-type connection, as is well known.

Figure 6:
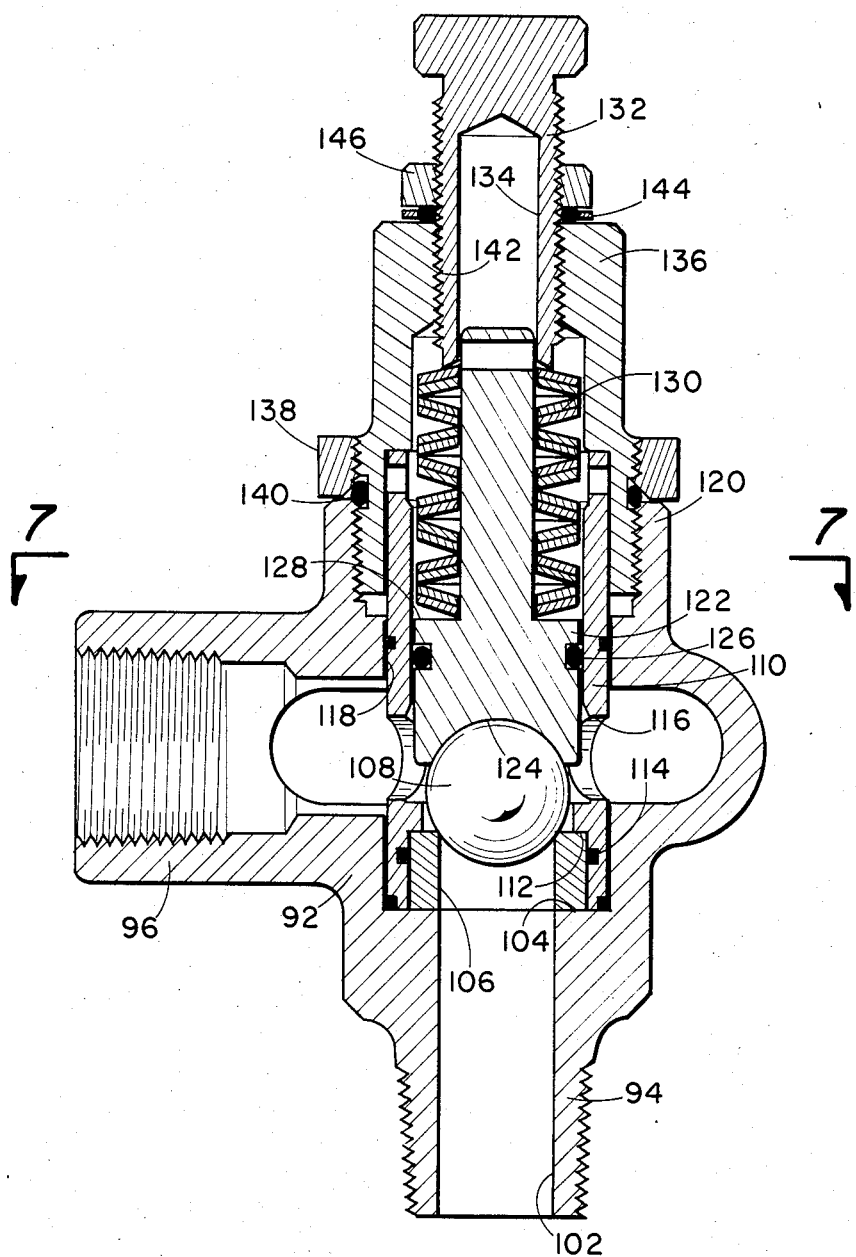
FIG. 6 is a view taken on line 6—6 of FIG. 5.
Figure 8:
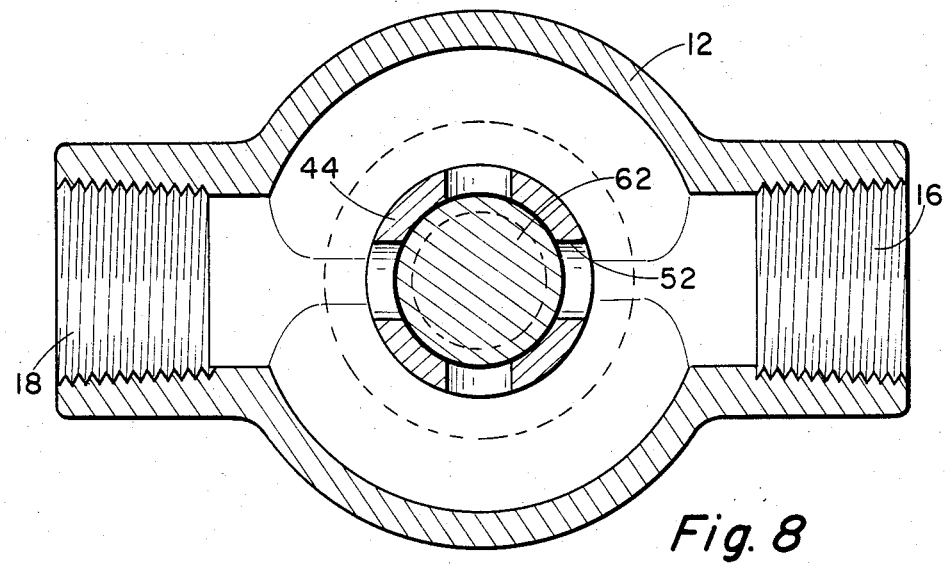
FIG. 8 is a view taken on line 8—8 of FIG. 3.
Figure 7:
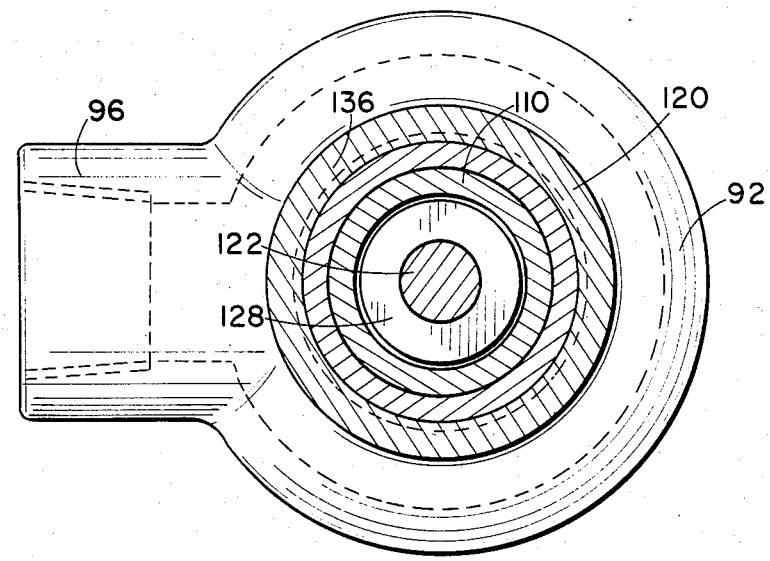
FIG. 7 is a view taken on line 7—7 of FIG. 6.

The inlet means 94 is provided with a central passageway 102 in open communication with the interior of the flow line (not shown) or the like for receiving the fluid pressure therefrom. The passageway 102 is enlarged at 104 to provide an annular shoulder for receiving a cylindrical valve seat means 106 thereon. A ball member 108 is disposed within the body 92 for engagement with the valve seat 106 in the closed position of the valve, as shown in FIG. 6. A housing or cage means 110 is slidably disposed within the body 92 and has an inwardly directed annular shoulder 112 provided therein for engaging the end of the valve seat 106 for securely retaining the valve seat 106 in engagement with the shoulder 104. Of course, it is preferable to provide suitable sealing means, such as O-rings 114 between the valve seat 106 and the cage 110 for precluding leakage of fluid therebetween. A plurality of circumferentially spaced ports or bores 116 are provided in the wall of the cage 110 in the proximity of the shoulder 112 for a purpose as will be hereinafter set forth. The cage 110 extends through a bore 118 provided in the body 92 and through a sleeve means 120 of the body 92. The bore 118 and sleeve means 120 are disposed in substantial axial alignment with the passageway 102, and the ball 108 is disposed within the cage 110.

A ball keeper means 122 is slidably disposed within the cage 110 and has an arcuate recess 124 provided at one end thereof for engagement with the outer periphery of the ball 108. Suitable sealing means, such as an O-ring 126 is preferably interposed between the outer periphery of the ball keeper means 122 and the inner periphery of the cage 110 for precluding leakage of fluid therebetween. The ball keeper means 122 is of a reduced diameter at 128 to provide an annular shoulder around the outer periphery thereof. A plurality of disc spring means 130 are superimposed around the outer periphery of the ball keeper 122 outboard of the shoulder 128 and the lowermost end of the stack of disc springs 130, as viewed in FIG. 6 is disposed against or in the proximity of the shoulder 128. An adjusting screw means 132 is provided with a central bore 134 extending longitudinally therein for slidably receiving the outer end of the ball keeper means 130 therein, and for engagement with the uppermost disc spring means 130, for a purpose as will be hereinafter set forth.

A housing or cap means 136 is disposed around the outer periphery of the cage 110, and is threadedly engaged with the inner periphery of the neck or sleeve 120. A suitable lock nut 138 is preferably secured around the outer periphery of the cap means 136 in the proximity of the sleeve 120 for locking the cap in position, as is well known, and suitable sealing means 140 may be interposed between the cap and the sleeve 120 for precluding leakage of fluid therebetween. A threaded bore 142 is provided in the outer end of the cap 136 for threaded engagement with the adjusting screw means 132, and suitable lock washer/seal means 144 and lock nut means 146 may be secured around the outer periphery of the adjusting screw 132 in the proximity of the cap 136 for locking the adjusting screw 132 in the selected position thereof with respect to the ball keeper 122.

In use, the valve 90 becomes a relief valve for liquids and may be installed in a flow line, fluid containing vessel, or the like (not shown) in the usual manner and whereby the inlet passageway 102 is in open communication with the fluid pressure present in the flow line or vessel. The adjusting screw 132 may be longitudinally adjusted with respect to the ball keeper 122 in order to provide the desired spring force for the disc spring assembly 130 acting on the shoulder 128. As long as the pressure within the passageway 102 is less than the force of the spring assembly 130, the ball keeper 122 will securely retain the ball 108 in engagement with the valve seat 106, thus providing a closed position for the valve 90. When the pressure within the passageway 102 exceeds the force of the spring assembly 130, the ball keeper 122 will move against the force of the springs, and the ball 108 will move away from the valve seat 106, thus establishing communication between the inlet port 94 and the outlet port 96 whereby the pressure may be vented through the outlet port. Of course, the valve 90 will remain in the open position therefor until the pressure within the passageway 102 falls below the force of the spring assembly 130, whereupon the springs will move the ball keeper 122 in a direction toward the valve seat 106 for closing the ball 108 thereagainst.

From the foregoing, it will be apparent that the present invention provides a novel relief valve having all of the working elements or moving components thereof installed within a single cage assembly which may be readily installed on or removed from the valve body without alteration of the installed position of the body. The valve may be changed from a gas safety valve to a liquid relief valve merely by removing one cage assembly and replacing thereof by another cage assembly. The novel valve includes a ball valve member, ball keeper and adjustable spring means housed within the cage assembly which assures an efficient operation of the valve and which facilitates the maintenance of the valve for prolonging the useful life thereof.

Whereas the present invention has been described in particular relation to the drawings attached hereto, it should be understood that other and further modifications, apart from those shown or suggested herein may be made within the spirit and scope of this invention.

What is claimed is:

1. A relief valve comprising:
(a) a body having an inlet in open communication with fluid pressure and an outlet intermittently in communication withthe inlet for venting of the fluid pressure from the interior of the body;
(b) an elongated tubular cage removably received within said body, said cage having at least one opening in the wall thereof intermediate the ends providing communication with said body outlet;
(c) a valve seat disposed within a first end of said cage;
(d) a ball disposed within the cage and engageable with the valve seat for providing a normally closed position for the valve;
(e) a ball keeper reciprocally disposed within said cage, the ball keeper being in contact at a first end with said ball, the ball keeper at the second end having an elongated cylindrical portion;
(f) a spring disposed within the cage and received on said cylindrical portion of said ball keeper for maintaining the ball keeper in contact with the ball;
(g) externally accessible hollow cap member secured to the body and receiving the second end of said cage therein, said hollow cap member having a threaded opening therein; and
(h) an externally threadable adjusting means threadably received in said cap member, one end thereof being in engagement with said spring for adjusting the force of the spring against the ball keeper whereby the valve is maintained in the closed position when the fluid pressure in the inlet means is less than the force of the spring, the adjusting means having an axial recess therein telescopically receiving and guiding said elongated cylindrical portion of said ball keeper, and wherein the valve can be easily disassembled by removing said cap member and said cage, said seat being retained by said cage.

2. A relief valve as set forth in claim 1 wherein said spring is disposed around the outer periphery of said cylindrical portion of said ball keeper and anchored between said ball keeper and said adjusting means for constantly urging said ball keeper in the direction toward said valve seat for providing a normally closed position for the valve.

3. A relief valve as set forth in claim 1 wherein said spring comprises a helical spring anchored between said ball keeper and said adjusting means for constantly urging said ball keeper in the direction toward said valve seat for providing a normally closed position for the valve.

4. A relief valve as set forth in claim 1 wherein said spring comprises a disc spring assembly disposed between said ball keeper and said adjusting means for constantly urging the ball keeper in the direction toward the valve seat.

* * * * *